(12) United States Patent
Fehrenbach et al.

(10) Patent No.: US 9,459,132 B2
(45) Date of Patent: Oct. 4, 2016

(54) MULTI-LIMIT LEVEL MEASURING DEVICE

(71) Applicant: VEGA Grieshaber KG, Wolfach (DE)

(72) Inventors: Josef Fehrenbach, Haslach (DE); Thomas Deck, Wolfach (DE); Martin Mellert, Steinach (DE)

(73) Assignee: VEGA GRIESHABER KG, Wolfach (DE)

( * ) Notice: Subject to any disclaimer, the term of this patent is extended or adjusted under 35 U.S.C. 154(b) by 133 days.

(21) Appl. No.: 14/295,612

(22) Filed: Jun. 4, 2014

(65) Prior Publication Data
US 2014/0360263 A1    Dec. 11, 2014

(30) Foreign Application Priority Data

Jun. 6, 2013    (EP) .................................... 13170914

(51) Int. Cl.
| | | |
|---|---|---|
| *G01F 23/00* | (2006.01) | |
| *G01F 23/28* | (2006.01) | |
| *G01F 23/296* | (2006.01) | |
| *G01L 9/00* | (2006.01) | |

(52) U.S. Cl.
CPC ......... *G01F 23/296* (2013.01); *G01F 23/0007* (2013.01); *G01F 23/0061* (2013.01); *G01F 23/0076* (2013.01); *G01F 23/2967* (2013.01); *G01F 23/2968* (2013.01); *G01L 9/0052* (2013.01); *G01L 9/0072* (2013.01)

(58) Field of Classification Search
None
See application file for complete search history.

(56) References Cited

U.S. PATENT DOCUMENTS

| | | | |
|---|---|---|---|
| 7,477,157 B2 * | 1/2009 | Dreyer | H04L 27/10 340/531 |
| 2007/0103333 A1 * | 5/2007 | Michalski | G01F 23/284 340/853.1 |
| 2010/0301878 A1 | 12/2010 | Armbruster et al. | |
| 2011/0270423 A1 * | 11/2011 | Maier | G05B 19/042 700/87 |
| 2015/0068300 A1 * | 3/2015 | Pfeiffer | G01F 23/2967 73/290 V |
| 2015/0107356 A1 * | 4/2015 | Schleith | G01F 23/0069 73/32 R |

FOREIGN PATENT DOCUMENTS

WO    2012/0149521    11/2012

* cited by examiner

*Primary Examiner* — Michael A Lyons
*Assistant Examiner* — Jermaine Jenkins
(74) *Attorney, Agent, or Firm* — Fay Kaplan & Marcin, LLP

(57) ABSTRACT

To detect a limit level, a multi-limit level measuring device is employed, which uses two different measured data evaluation methods. The measured data to be evaluated is acquired by a multi-limit level sensor arrangement which can use different physical measurement principles. In this manner, the likelihood of the limit level being erroneously detected may be reduced.

12 Claims, 3 Drawing Sheets

MULTI-LIMIT LEVEL MEASURING DEVICE

REFERENCE TO RELATED APPLICATIONS

This application claims the benefit of the filing date of European Patent Applications Serial No. 13 170 914.9 filed on 6 Jun. 2013, the disclosure of which is hereby incorporated herein by reference.

FIELD OF THE INVENTION

The invention relates to limit level measurement. In particular, the invention relates to a multi-limit level measuring device for determining a limit level, using at least two different measured data evaluation methods, to the use of a first limit level sensor and of a second limit level sensor for determining a limit level, to an evaluation unit for determining a limit level, using at least two different measured data evaluation methods, and to a method for limit level determination, to a program element and to a computer-readable medium.

TECHNICAL BACKGROUND

To measure the limit level in containers, vibration sensors are often used, which comprise two limbs which are set vibrating by an actuator. This type of sensor is also known as a "tuning fork". A limit level sensor of this type has a relatively complex mechanical structure and is not suitable for some media. In particular, a build-up of deposits on the sensor surface may lead to measurement inaccuracies.

SUMMARY OF THE INVENTION

According to a first aspect of the invention, a multi-limit level measuring device is provided, which is configured to determine a limit level, using at least two different measured data evaluation methods. The use of just one of the two measured data evaluation methods can detect the limit level of a filling medium in a container. Thus, in other words, the use of the first measured data evaluation method results in a first limit level detection and the use of the second measured data evaluation method results in a second limit level detection or alternatively in a plausibility check of the first measured data evaluation method.

The multi-limit level measuring device comprises a multi-limit level sensor arrangement for acquiring measured data, as well as an evaluation unit for evaluating at least a first subset of the acquired measured data (or all of the acquired measured data) and at least a second subset of the acquired measured data (or all of the acquired measured data). The evaluation of at least the first subset is used to determine the limit level, using the first measured data evaluation method, and the evaluation of at least the second subset is used to determine the limit level, using the second measured data evaluation method.

For this purpose, the multi-limit level sensor arrangement can comprise one or more sensors, which pick up the measured data. For example, it is possible for these sensors to use different physical measurement methods, and thus to determine the limit level in a basically different way. It is also possible, for example, for the multi-limit level sensor arrangement to carry out different measurements, using the same sensor or sensors, and thus to record different sets of data, which are then subjected to different evaluation methods.

The outcome of the evaluation is two measurement results, both of which can be used to decide whether or not the limit level has been reached.

According to an embodiment of the invention, the multi-limit level sensor arrangement comprises a housing with an end region which is intended for immersion into a filling medium, to determine the limit level (limit level detection), this end region of the housing having a single cross-sectional surface and thus not extending in a forked manner (unlike a tuning fork).

Therefore, the end region of the housing does not form two limbs, but is configured in the shape of a box, a rod or the like.

According to a further embodiment of the invention, at least the end region of the housing consists of metal. The remaining region of the housing can also consist entirely or substantially of metal.

According to a further embodiment of the invention, at least the end region of the housing consists of an electrically non-conductive material.

According to a further embodiment of the invention, at least the end region of the housing consists of a metal and of an electrically non-conductive material. The alternation between metal and electrically non-conductive material can take place in portions so that therefore specific regions of the housing are produced from metal and other specific regions of the housing are produced from the electrically non-conductive material.

According to a further embodiment of the invention, the multi-limit level sensor arrangement comprises a vibration actuator which is attached to the inside of the end region of the housing, to transmit vibrations onto the end region of the housing.

Thus, the end region of the housing can be set to vibrate.

The multi-limit level sensor arrangement can then measure the vibration of the housing, for example the resonant frequency or vibration amplitude thereof, using this or another vibration actuator, to decide whether or not the limit level of the filling medium has been reached.

According to a further embodiment of the invention, the multi-limit level sensor arrangement comprises a diaphragm which is attached in the end region of the housing and is configured to pick up the vibration of the vibration actuator.

Furthermore, the multi-limit level sensor arrangement can comprise a strain gauge or another system used for pressure measurement, to pick up at least the first subset of the measured data to be acquired.

The multi-limit level sensor arrangement can also comprise a vibration sensor to pick up the second subset of the measured data.

According to a further embodiment of the invention, the multi-limit level sensor arrangement comprises a radar sensor, a capacitive sensor, an impedance sensor, an optical sensor, a temperature sensor and/or a conductivity sensor, to pick up the first and/or second subset of the acquired measured data.

According to an embodiment of the invention, for limit level determination, the multi-limit level measuring device can use two or more physical measurement principles and can thereby perform two or more limit level detections (limit level determinations) separately from one another. Here, it is possible for both measurement principles to always be used, to reduce the likelihood of a faulty measurement. The second measurement principle can be used, for example, to check the plausibility of the result of the first measurement principle.

It is also possible for the multi-limit level measuring device to automatically change over between the first measured data evaluation method and the second measured data evaluation method, subject to environmental conditions (type of filling medium, temperature, air humidity, etc.). Because this change-over takes place, it can suffice to merely acquire the measured data which is to be used for the appropriate, activated measured data evaluation method. In this case, the components of the multi-limit level sensor arrangement, which have nothing to do with the acquisition of this measured data, can be deactivated.

Thus, the multi-limit level measuring device can be configured, for example, for the use of two different physical measurement principles. It can comprise a simple sensor system which can be used in almost all media due to the use of different physical measurement principles.

A further aspect of the invention provides the use of a first limit level sensor and of a second limit level sensor inside a housing, to detect a limit level. The limit level sensors can be continuously measuring sensors, or conventional limit level sensors which can merely determine whether or not the limit level has been reached.

A further aspect of the invention provides an evaluation unit for the detection of a limit level, using at least two different measured data evaluation methods. The limit level can be detected, using respectively one of the two measured data evaluation methods. The evaluation unit is configured to evaluate at least a first subset of acquired measured data in order to detect the limit level, using a first measured data evaluation method, and is configured to evaluate at least a second subset of the acquired measured data in order to detect the limit level, using a second measured data evaluation method.

A further aspect of the invention provides a method for detecting a limit level, using at least two different measured data evaluation methods, in which method measured data is acquired by a multi-limit level sensor arrangement, at least a first subset of the acquired measured data is evaluated in order to detect the limit level, using a first measured data evaluation method, and at least a second subset of the acquired measured data is evaluated in order to detect the limit level, using a second measured data evaluation method, the two measured data evaluation methods being different methods.

A further aspect of the invention provides a program element which, when executed on the processor of a multi-limit level measuring device, instructs the measuring device to carry out the steps described above and in the following.

A further aspect of the invention provides a computer-readable medium on which a program element is stored which, when executed on the processor of a multi-limit level measuring device, instructs the measuring device to carry out the steps described above and in the following.

Furthermore, it is pointed out that the multi-limit level measuring device can be configured to carry out all the steps described above and in the following.

In the following, embodiments of the invention will be described with reference to the figures.

DETAILED DESCRIPTION OF EMBODIMENTS

Figure 1:
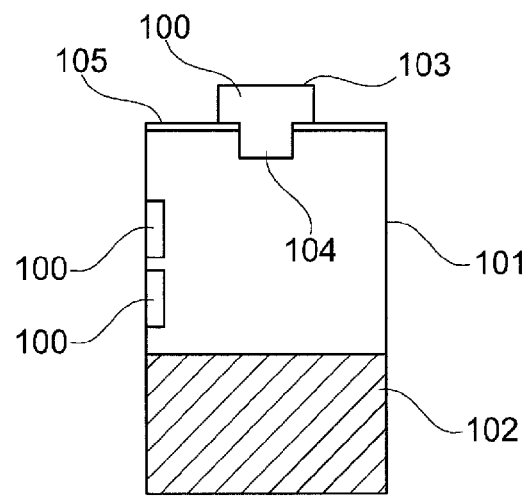
FIG. 1 shows a container which is partly filled with a filling medium and has three multi-limit level measuring devices.

The illustrations in the figures are schematic and are not true to scale.

When, in the following description of the figures, the same reference numerals are used in different figures, they identify the same or similar elements. However, the same or similar elements can also be identified by different reference numerals.

FIG. 1 shows a container 101 containing a filling medium 102. Three multi-limit level sensors 100 are provided, one of which is installed in the lid 105 of the container and the other two are attached to a side wall of the container.

The multi-limit level measuring device installed in the lid of the container can be screwed into a container flange for example. The measuring devices attached to the side wall of the container can be configured so that they are screwed directly onto the container wall or are attached thereto in another way.

The upper multisensor has a basic body 103 and an end region 104 which projects into the container and is configured for contact with the filling medium 102. When the filling medium reaches the housing part 104 of the multi-limit level measuring device, which part 104 comprises the limit level sensor system, the filling medium is detected by the measuring device.

To reduce the likelihood of errors in the limit level detection, the measuring device comprises a multi-limit level sensor arrangement which is able to pick up measured data which, when analysed, can determine whether or not the limit level has been reached. The acquired measured data can be evaluated and analysed in two or more different ways. To pick up measured data, different individual sensors can be provided so that, to detect the limit level, for example the measured data of a sensor or of a group of sensors is evaluated by a first measured data evaluation method and the measured data of a second sensor or of a second group of sensors is evaluated and analysed by a second measured data evaluation method. The result of this evaluation and analysis are two or more answers to the question whether or not the limit level has already been reached.

The different measured data evaluation methods can be used to carry out a plausibility check of the measurement result, thereby reducing the likelihood of a false end result.

Figure 2:
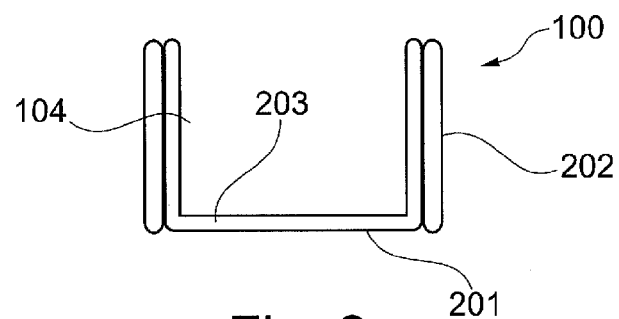
FIG. 2 shows the end region of a multi-limit level measuring device according to an embodiment of the invention.

FIG. 2 shows the end region 104 of the housing of a multi-limit level measuring device, in which the sensor system or at least substantial parts of the sensor system are housed. The end region of the housing is located in a duct through a container lid or a container wall 202 and terminates flush for example, with the lower end of the duct. The base 201 of the housing end region can have a diaphragm 203 which is stimulated to vibrate by an actuator of the multi-limit level measuring device. A sensor system is provided, which measures the resonant frequency or the amplitude of this diaphragm vibration and can thereby detect the limit level as soon as it becomes evident.

In the embodiment of FIG. 2, at least the end region of the housing is produced from metal. For example, the entire housing of the multi-limit level measuring device can be made of metal.

The housing can be cylindrical or rectangular for example. Furthermore, the cross-sectional area of the end region can be oval.

If the housing or at least the end region of the housing is made of metal, it is possible to detect the limit level by the vibration behaviour of "diaphragm" 203. For this, it is possible to use vibrations in the ultrasonic range, of which the frequency, amplitude, quality and/or different vibration modes are measured.

In addition, the pressure outside the measuring device can be measured, for example using strain gauges which are adhesively bonded to the interior or to the exterior of the housing or are attached in another manner thereto. When the end region of the housing is immersed into the filling medium, the pressure on the housing changes significantly and this change in pressure can be detected by the strain gauges.

Figure 3:
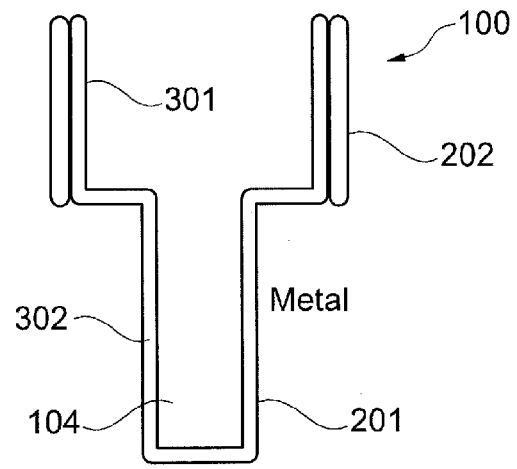
FIG. 3 shows the end region of a multi-limit level measuring device according to a further embodiment of the invention.

The embodiment of FIG. 3 shows a multi-limit level measuring device 100 in which the end region of the housing is also made of metal, a rod or pot 302 projecting into the container.

Similarly to the embodiment of FIG. 2, the upper region 301 of the housing can be screwed into the flange of the container. This wider region is then joined to the narrower end region 302.

Instead of the diaphragm shown in FIG. 2, in the embodiment of FIG. 3 the vibration behaviour of the rod-shaped region 302 can be measured. In addition, a strain gauge can measure the deflection of the rod, which occurs due to buoyancy in the filling medium. Furthermore, temperature measurements can be provided which can be carried out in different areas of the rod and can possibly accompany an additional heating of the rod.

From the variety of measured data acquired in these and the other embodiments, it is possible, using two or more than two measured data evaluation methods, to establish very accurately whether or not the limit level has been reached.

Figure 4:
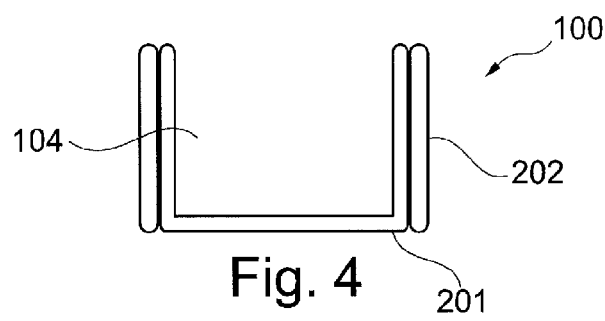
FIG. 4 shows the end region of a multi-limit level measuring device according to a further embodiment of the invention.

FIG. 4 shows the end region 104 of a housing which has a partly or completely non-conductive case. It is possible to provide the same multi-limit level sensor arrangements as in the embodiments of FIGS. 2 and 3 and in particular it is possible for the same measurements to be made as in the case of the metallic housing. Furthermore, however, radar measurements (freely radiating or guided), capacitive measurements with different frequencies, impedance measurements and optical measurements with light can also be provided. In this case, a corresponding radar sensor, a capacitive sensor, an impedance sensor and/or an optical sensor is/are installed in the housing.

Figure 5:
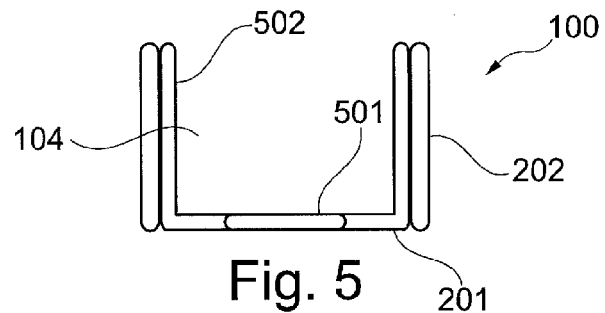
FIG. 5 shows the end region of a multi-limit level measuring device according to a further embodiment of the invention.

FIG. 5 shows an embodiment of a multi-limit level measuring device having a housing end region 201 which is metallic in a first region 501 and consists of an electrically non-conductive material in a second region 502.

The metallic region is located in the base of the end region for example, and can be circular and arranged coaxially to the longitudinal axis of the measuring device. The remaining regions of the housing can consist of non-conductive material.

In this embodiment, depending on the configuration of the measuring device, the same measurements can be made as in the embodiment of FIG. 4. Furthermore, it is possible to provide a conductive measurement and/or a capacitive measurement combined with a conductive measurement. The capacitive measurement and conductive measurement can be used for a mutual plausibility check.

Figure 6:
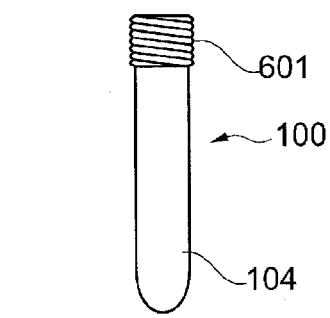
FIG. 6 shows a multi-limit level measuring device according to a further embodiment of the invention.

FIG. 6 shows a further embodiment in which the multi-limit level measuring device 100 has a cylindrical housing which is rounded in the lower region. A thread can be provided in the upper region 601 so that the measuring device can be screwed into a container flange.

The drip behaviour can be improved by the rounding in the lower region.

Figure 7:
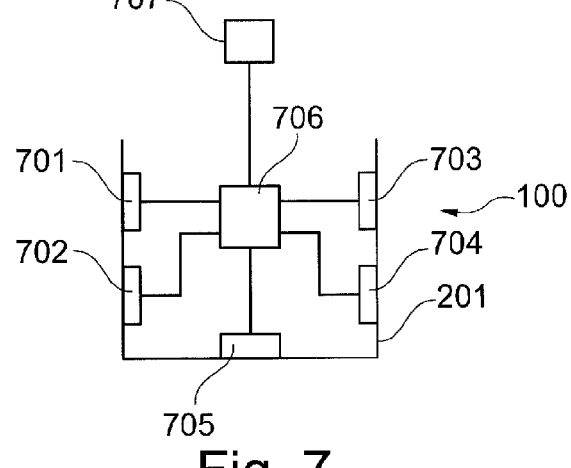
FIG. 7 shows the end region of a multi-limit level measuring device according to a further embodiment of the invention.

FIG. 7 shows a further embodiment of the end region of the housing. A plurality of individual sensors 701, 702, 703, 704, 705 is provided. Sensors 703, 704, 705 are for example piezo actuators which, on the one hand, can introduce vibrations into the housing or diaphragm and, on the other, can pick up changes in pressure, which can then be evaluated. Sensors 701, 702 are strain gauges for example.

By way of example, the end region of the housing 100 has a diameter of 2 cm and a length of 3 cm.

Since the multi-limit level measuring device detects the limit level in at least two different ways, it can have a universal application. For example, subject to the measurement environment, it is possible to select the measured data evaluation method which is the most suitable in each case. It is also possible for additional measured data evaluation methods to be used, to check the plausibility of the measurement result.

Figure 8:
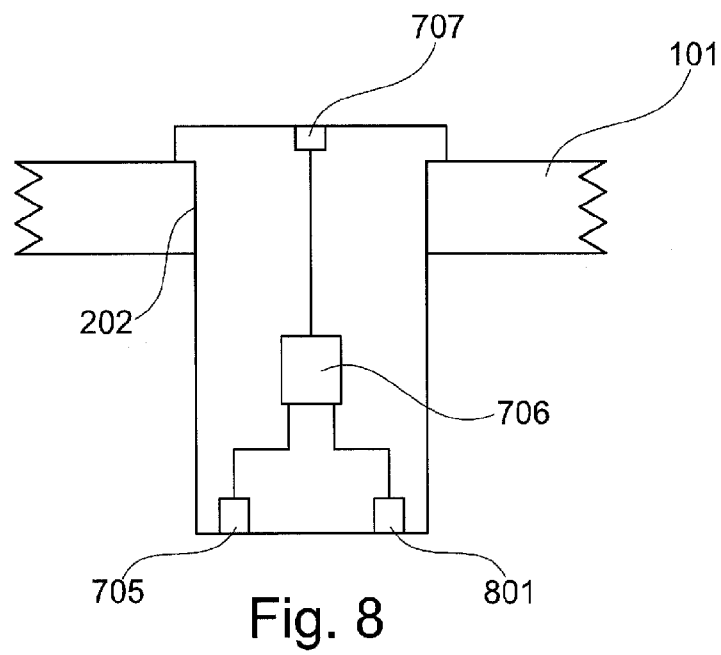
FIG. 8 shows a multi-limit level measuring device according to a further embodiment of the invention.

FIG. 8 shows a further embodiment of a multi-limit level measuring device. The measuring device comprises two sensors 705, 801 which are each used to detect a limit level. Sensor 705 can be a piezo actuator for example, and sensor 801 can be a radar sensor, an optical sensor, a temperature sensor, an impedance sensor or a capacitive sensor.

Both sensors are connected to the processor 706 of an evaluation unit, which receives and evaluates the measured data from the sensors. Accordingly, the sensors shown in FIG. 7 are also connected to the processor 706. Furthermore, the processor 706 is connected to an interface 707 by which the measuring device can be connected to further devices, for example via a 4 . . . 20 mA two-wire circuit.

It is also possible for a wireless interface to be provided for the wireless transmission of the data generated by the processor 706.

Figure 9:
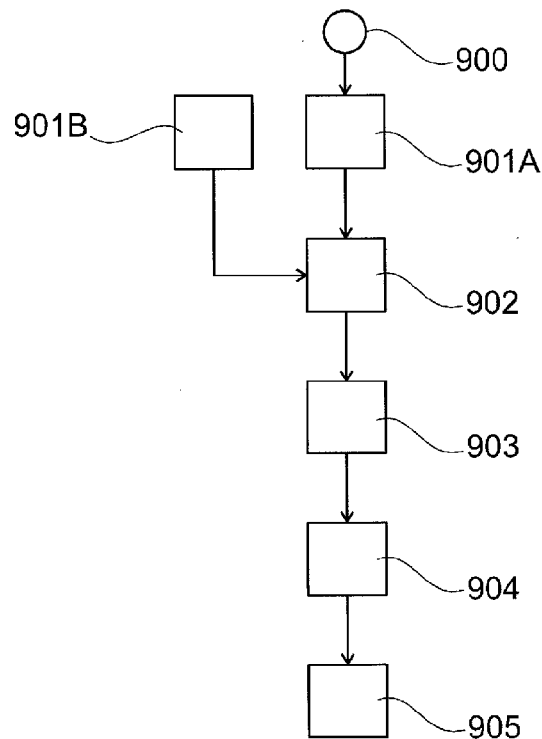
FIG. 9 shows the flow chart of a method according to an embodiment of the invention.

FIG. 9 shows the flow chart of a method according to an embodiment of the invention.

The method starts with step 900. In step 901A, the first measured data is picked up by one or more sensors of a multi-limit level sensor arrangement and before, after or at the same time, in step 901B the second measured data is picked up by the same sensor arrangement or by another sensor arrangement of the multi-limit level sensor arrangement. In step 902, the first measured data is then evaluated, using a first measured data evaluation method, to detect the limit level. Likewise, the second measured data is evaluated, using a second measured data evaluation method, to also detect the limit level. In step 903 a check is made to ascertain whether the results of the two evaluations match. If this is the case, in step 904 it can be assumed that the measurement result is correct and it is output in step 905.

If this is not the case, i.e. if the two measurement results do not match, the measuring device implements a third measured data evaluation method which has recourse to the first, second or further measured data, also to be acquired (for example by a third sensor arrangement).

This may reduce the likelihood of a faulty overall measurement result.

In addition, it is pointed out that the terms "comprising" and "having" do not exclude any other elements or steps and "a" or "an" does not exclude a plurality. It is also pointed out that features or steps, which have been described with reference to one of the above embodiments, can also be used combined with other features or steps of other embodiments described above. Reference numerals in the claims should not be construed as limiting the scope of the claims.

The invention claimed is:

1. A multi-limit level measuring device comprising:
    a multi-limit level sensor arrangement acquiring measured data; and
    an evaluation unit using a first measured data evaluation method to evaluate at least a first subset of the acquired measured data in order to detect the limit level, the evaluation unit further using a second measured data evaluation method to evaluate at least a second subset of the acquired measured data in order to detect the limit level, the first measured data evaluation method being different from the second measured data evaluation method;
    wherein the multi-limit sensor arrangement comprises a housing having an end region configured for immersion into a filling medium, to determine the limit level, and
    wherein the end region of the housing has a single cross-sectional area and thus does not extend in a forked manner.

2. The multi-limit level measuring device according to claim 1, wherein at least the end region of the housing consists of metal.

3. The multi-limit level measuring device according to claim 1, wherein at least the end region of the housing consists of an electrically non-conductive material.

4. The multi-limit level measuring device according to claim 1, wherein at least the end region of the housing consists of metal and an electrically non-conductive material.

5. The multi-limit level measuring device according to claim 1, further comprising:
    a vibration actuator attached to an inside of the end region of the housing, to transmit vibrations onto the end region of the housing.

6. The multi-limit level measuring device according to claim 5, further comprising:
    a diaphragm fitted in the end region of the housing and configured to pick up the vibrations from the vibration actuator.

7. The multi-limit level measuring device according to claim 1, further comprising:
    a strain gauge picking up the first subset of the measured data.

8. The multi-limit level measuring device according to claim 1, further comprising:
    a vibration sensor picking up the second subset of the measured data.

9. The multi-limit level measuring device according to claim 1, further comprising:
    a sensor picking up one of the first and second subsets of the acquired measured data, the sensor including one of a radar sensor, a capacitive sensor, an impedance sensor, an optical sensor, a temperature sensor and a conductivity sensor.

10. An evaluation unit for detecting a limit level, the evaluation unit comprising
    a processor; and
    a non-transitory computer readable storage medium including a set of instructions executable by the processor, wherein the instructions, when executed, cause the processor to:
    utilize a first measured data evaluation method and a second measured data evaluation method, the first and the second measured data evaluation method being configured to detect the limit level, and
    evaluate at least a first subset of acquired measured data in order to detect the limit level using the first measured data evaluation method, and is further configured to evaluate at least a second subset of the acquired measured data in order to detect the limit level using the second measured data evaluation method, the first measured data evaluation method being different from the second measured data evaluation method;
    wherein the evaluation unit receives the acquired measured data from a multi-limit sensor arrangement, the multi-limit sensor arrangement comprising a housing having an end region configured for immersion into a filling medium to determine the limit level, and
    wherein the end region of the housing has a single cross-sectional area and thus does not extend in a forked manner.

11. A method for detecting a limit level, using at least two different measured data evaluation methods, comprising the steps:
    obtaining measured data by a multi-limit level sensor arrangement;
    evaluating at least a first subset of the acquired measured data in order to detect the limit level, using a first measured data evaluation method; and
    evaluating at least a second subset of the acquired measured data in order to detect the limit level, using a second measured data evaluation method;
    wherein the first method is different than the second method,
    wherein the multi-limit sensor arrangement comprises a housing having an end region configured for immersion into a filling medium, to determine the limit level, and
    wherein the end region of the housing has a single cross-sectional area and thus does not extend in a forked manner.

12. A non-transitory computer-readable medium on which a program element is stored which, when executed on a processor of a multi-limit level measuring device, instructs the multi-limit level measuring device to carry out the method steps according to claim 11.

* * * * *